(12) United States Patent
Schmidt et al.

(10) Patent No.: US 9,256,933 B2
(45) Date of Patent: Feb. 9, 2016

(54) SYSTEM FOR DETERMINING FLOW PROPERTIES OF A BLOOD VESSEL

(75) Inventors: Samuel Emil Schmidt, Aalborg SØ (DK); Lasse Riis Østergaard, Klarup (DK); Niels-Henrik Staalsen, Nibe (DK); Kasper Lundhus, Aarhus (DK); Michael Svorkmo, Oslo (NO)

(73) Assignees: Region Nordjylland, Aalborg Sygehus, Aalborg Ø (DK); Aalborg Universitet, Aalborg Ø (DK)

( * ) Notice: Subject to any disclaimer, the term of this patent is extended or adjusted under 35 U.S.C. 154(b) by 358 days.

(21) Appl. No.: 13/983,867

(22) PCT Filed: Feb. 8, 2012

(86) PCT No.: PCT/DK2012/050048
§ 371 (c)(1),
(2), (4) Date: Nov. 15, 2013

(87) PCT Pub. No.: WO2012/107050
PCT Pub. Date: Aug. 16, 2012

(65) Prior Publication Data
US 2014/0064582 A1 Mar. 6, 2014

(30) Foreign Application Priority Data
Feb. 8, 2011 (DK) .................. 2011 00082

(51) Int. Cl.
*G06K 9/00* (2006.01)
*G06T 7/00* (2006.01)
*G06T 7/60* (2006.01)

(52) U.S. Cl.
CPC .............. *G06T 7/0012* (2013.01); *G06T 7/0014* (2013.01); *G06T 7/602* (2013.01); *G06T 2207/30104* (2013.01)

(58) Field of Classification Search
None
See application file for complete search history.

(56) References Cited

U.S. PATENT DOCUMENTS 5,105,452 A * 4/1992 McInerney ............. A61B 6/032
378/19
5,435,310 A 7/1995 Sheehan et al.
(Continued)

FOREIGN PATENT DOCUMENTS

WO    WO 01/43073 A1    6/2001

OTHER PUBLICATIONS

Ku et al. "In Vivo Validation of Numerical Prediction of Blood Flow in Arterial Bypass Grafts," 2002, Annals of Biomedical Engineering, vol. 30, pp. 743-752.*

(Continued)

*Primary Examiner* — Vu Le
*Assistant Examiner* — Samah Beg
(74) *Attorney, Agent, or Firm* — Knobbe Martens Olson & Bear LLP

(57) ABSTRACT

The invention relates to a method for providing quantitative measures of the flow property of a blood vessel. The method is based on analyzing cross-sectional images of a vessel by estimating the area of the lumen of the vessel. The method comprises steps of determining a point contained within the walls of the vessel, determining a closed path which approximates the inner circumference of the wall of the vessel, and determining the area of the closed path when the vessel is most expanding in order to get a measurement of the maximum lumen. This method may enable the clinical personnel to quickly evaluate the flow property e.g. of an inserted bypass vessel and, thereby, conclude if the surgical intervention is successful or if adjustments are required.

9 Claims, 9 Drawing Sheets

(56) References Cited

U.S. PATENT DOCUMENTS

| | | | |
|---|---|---|---|
| 6,151,404 A | 11/2000 | Pieper | |
| 6,458,086 B1* | 10/2002 | Franco | A61B 5/0002 600/454 |
| 6,782,284 B1* | 8/2004 | Subramanyan | G06T 7/0012 378/21 |
| 8,311,747 B2* | 11/2012 | Taylor | A61B 5/02007 382/128 |
| 2002/0136440 A1* | 9/2002 | Yim | G06T 17/20 382/131 |
| 2004/0116808 A1* | 6/2004 | Fritz | A61B 5/02007 600/437 |
| 2004/0243006 A1* | 12/2004 | Nakata | A61B 5/02007 600/485 |
| 2007/0014451 A1* | 1/2007 | Dwyer | A61F 2/06 382/128 |
| 2007/0297561 A1* | 12/2007 | Breeuwer | G06T 7/0083 378/4 |
| 2008/0018645 A1 | 1/2008 | Dwyer et al. | |
| 2008/0137926 A1* | 6/2008 | Skinner | G06K 9/34 382/131 |
| 2008/0192998 A1 | 8/2008 | Takeguchi et al. | |
| 2008/0228086 A1* | 9/2008 | Ilegbusi | A61B 5/0066 600/479 |
| 2008/0317310 A1* | 12/2008 | Suresh | A61B 5/02007 382/130 |
| 2010/0166283 A1* | 7/2010 | Grosskopf | A61B 6/466 382/131 |
| 2011/0071404 A1* | 3/2011 | Schmitt | A61B 5/0066 600/479 |
| 2011/0103665 A1* | 5/2011 | Gulsun | G06T 7/2046 382/131 |
| 2011/0319762 A1* | 12/2011 | Lerman | A61B 8/06 600/443 |
| 2012/0078106 A1* | 3/2012 | Dentinger | A61B 8/06 600/454 |
| 2012/0095332 A1* | 4/2012 | Nitta | A61B 5/02007 600/437 |
| 2013/0066219 A1* | 3/2013 | Jiang | A61B 5/026 600/504 |
| 2013/0243294 A1* | 9/2013 | Ralovich | G06T 7/0012 382/131 |
| 2013/0245456 A1* | 9/2013 | Ferguson, Jr. | A61B 5/0059 600/473 |
| 2014/0364739 A1* | 12/2014 | Liu | A61B 8/5223 600/449 |
| 2015/0051885 A1* | 2/2015 | Grady | G06F 19/3437 703/2 |
| 2015/0066818 A1* | 3/2015 | Choi | G06F 19/3437 706/12 |
| 2015/0173716 A1* | 6/2015 | Lee | A61B 8/06 600/441 |

OTHER PUBLICATIONS

Langerak et al. "Evaluation of Coronary Artery Bypass Grafts by Magnetic Resonance Imaging," Journal of Magnetic Resonance Imaging, 1999, vol. 10, pp. 434-441.*

Badie, Behnam et al., "Intraoperative Sonographic Assessment of Graft Patency during Extracranial-intracranial Bypass" AJNR Am J Neuroradiol, Sep. 2000, pp. 1457-1459, vol. 21.

Hiratzka, Loren F. et al., "Intraoperative evaluation of coronary artery bypass graft anastomoses with high-frequency epicardial echocardiography: experimental validation and initial patient studies" Circulation, 1986, pp. 1199-1205, vol. 73, No. 6.

Kharboutly, Z. et al., "Investigations into the relationship between hemodynamics and vascular alterations in an established arteriovenous fistula" Medical Engineering & Physics, 2007, pp. 999-1007, vol. 29.

* cited by examiner

SYSTEM FOR DETERMINING FLOW PROPERTIES OF A BLOOD VESSEL

CROSS REFERENCE TO RELATED APPLICATIONS

This application is a U.S. National Phase Application of PCT International Application Number PCT/DK2012/050048, filed on Feb. 8, 2012, designating the United States of America and published in the English language, which is an International Application of and claims the benefit of priority to Danish Patent Application No. PA 2011 00082, filed on Feb. 8, 2011. The disclosures of the above-referenced applications are hereby expressly incorporated by reference in their entireties.

FIELD OF THE INVENTION

The invention relates to methods for determining flow properties of blood vessels, and in particular image based methods.

BACKGROUND OF THE INVENTION

Currently, the methods used for assessing the quality of bypass operations may be seen as insufficient to correctly detect weaknesses of the bypass graft. Current methods may be based on simply using tactile senses, i.e. fingertips, for assessing whether the bypass vessel is properly attached. One problem that may arise is that the attached bypass vessel limits the flow of blood too much due to a narrowing at the joint between the vessel and the bypass vessel.

To avoid complications it would be desirable to be able to quickly and accurately determine the quality of the bypass vessel, e.g. to determine if the lumen of the bypass vessel is sufficiently large.

The paper "Intraoperative evaluation of coronary artery bypass graft anastomoses with high-frequency epicardial echocardiography: experimental validation and initial patient studies, L F Hiratzka, D D McPherson, W C Lamberth, Jr, B Brandt, 3d, M L Armstrong, E Schroder, M Hunt, R Kieso, M D Megan and P K Tompkins, in Circulation 1986; 73; 1199-1205, © 1986 American Heart Association. ISSN: 0009-7322" discloses a method where a high-frequency epicardial echocardiography performed intraoperatively could assess coronary artery bypass graft anastomoses by providing on-line short-axis (cross-sectional) and longitudinal two-dimensional images of the vessels. To validate measurements of anastomoses with high-frequency epicardial echocardiography, luminal diameter determined by high-frequency epicardial echocardiography was compared with that determined histologically after perfusion fixation in 12 dogs studied after coronary artery bypass grafting.

Whereas the above paper discusses evaluation of vessels and bypass graft anastomoses, the paper does not satisfactorily provide a method which is applicable to clinical use in a hospital environment. Therefore inventor of the present invention has appreciated that an improved method for evaluating flow properties of vessels is of benefit, and has in consequence devised the present invention.

SUMMARY OF THE INVENTION

It would be desirable to enable to provide a system capable of analyzing the flow properties of blood vessels and capable of providing qualitative analysis results of the flow properties. Accordingly, it may be seen as an object of the present invention to provide a method and a system that meet such objectives and that solves the above mentioned problems, as well as similar and other problems of the prior art.

To better address one or more of these concerns, in a first aspect of the invention a system for determining flow properties of a blood vessel is presented, where the system comprises a processing unit for analyzing medical images of cross-sectional views of the blood vessel (where different views are obtained at different location along the vessel), where the images are obtained from a medical imaging device, and where the processing unit includes electronic hardware and/or a processor for executing computer program code, the hardware and/or the computer program being configured for analyzing the images by performing steps:

a) determining a point or a collection of points encircled or surrounded by a wall of the cross sectional view of the vessel of an image, b) using the encircled point to obtain a closed vessel contour which models the wall of the cross sectional view of the vessel by locating an adaptable closed circular contour so that it surrounds the encircled point and deforming the adaptable closed contour towards the wall of the cross sectional view of the vessel, for a plurality of the images, where at least some of the the plurality of images originate from different locations along a length of the blood vessel, and further configured for analyzing the images by performing steps:

selecting a reference image and determine a reference area or reference radius of the closed vessel contour, where the reference image originate from a reference location of the vessel, for at least some of the plurality images analysed according to steps a) and b) determine an area or radius of the closed vessel contour, and comparing the reference area or reference radius with an area or radius of one of the plurality of images so as to obtain information about the flow property of the blood vessel.

The reference image may originate from the plurality of analysed images or from an other initial image obtained from an initial reference imaging procedure. E.g. the reference image may be taken as the first of the plurality of analysed images, or the reference image may originate from a separate imaging process where the operator of the imaging device locates the imaging device at a specific location of a vessel located some distance from the portion of the vessel to be analysed.

The wall of the vessel is identifiable in the image as one or more connected or unconnected segments of the vessel. The encircled point may be determined manually by enabling the user to indicate a point on a display (showing the image) which should be used as the encircled point. Alternatively, the encircled point may be determined by automatic methods as described in the detailed description.

The closed vessel contour models the wall of the vessel. For example, the vessel contour may approximate the inner edge of the vessel, i.e. the inner edge which forms the boundary between the vessel tissue and the lumen of the vessel. Alternatively, the vessel contour may approximate any other closed contour of the vessel, for example the outer edge of the vessel or a contour located between the inner and outer edge.

The deforming of the adaptable closed contour towards the wall of the cross sectional view may be performed by expanding sections of the flexible contour until the contour section makes contact with the wall of the vessel or otherwise approximates the location of the vessel wall or wall boundary. A test for contact or specific locations of the contour relative to the wall of the vessel may be set by energy formations of the wall and adaptable contour, or other formulations which quantifies the location of sections of the deformable contour relative to the wall of the vessel.

The specific expansion state of the vessel and, thereby, the selection of an image from the plurality of images may be performed by analyzing and EKG signal which has been measured simultaneously with obtaining images so that the signal and images are synchronized. By analyzing the EKG signal, then e.g. the largest expansion of the vessel may be determined. Alternatively, the specific expansion state such as the largest expansion may be directly determined by calculating the area or radius of the lumen of the vessel.

In case the specific expansion state of the vessel is determined by EKG analysis or other indirect methods, the image having the specific expansion state, e.g. largest lumen, may be determined prior to determining the encircled point and determining closed vessel contour which models the wall of the cross sectional view of the vessel. In case the specific expansion state of the vessel is determined by calculating the area of the lumen, the image having the specific expansion state, may preferably be determined subsequent to determining the encircled point and closed vessel contour. In case an indirect method, such as EKG analysis is used for selecting a specific image showing a specific expansion state of the vessel, then only one of images need to be analyzed in order to determine the vessel contour which models the wall of the cross sectional (for calculation of lumen area). In case the specific image is selected by direct calculation of the lumen area, preferably a plurality of the images are analyzed for determining the vessel contour (in order to enable selection of the image showing e.g. the largest vessel expansion).

It is understood that the flow property of the blood vessel is characterized by the area of the vessel, i.e. the approximate area of the lumen of the vessel.

The area may be determined by for example by overlaying the closed vessel contour with a grid and calculating the area of the grid elements which are encircled by the vessel contour. The radius may be found by a similar grid based method, possibly the radius may be a mean radius obtained by averaging different radii of the vessel contour.

The processing unit may be a computer or an electronic circuit comprising an image processor. The computer or the image processor may be configured to run a computer program code stored on a tangible media such as a DVD or a read only memory (ROM) contained within the processing unit, where the computer program contains algorithms or code capable of performing one or more of the steps according to the first aspect and other embodiments of the invention.

In an embodiment, the invention relates to a system where determining a point encircled by the wall of the cross sectional view of the vessel comprises determining a best fit between the wall and a predefined circle, or comprises determining which circle or circles of a selection of circles having radii within a preselected interval of radii (rmin, rmax) provides a best fit of the wall, where the center of the circle provides an estimate of the point encircled by edges of the cross-sectional view of the blood vessel.

Accordingly the determination of a best fit may be based on a single predefined circle or a selection of circles.

In an embodiment determining the encircled point comprises
determining edges in the medical image, where at least some of the edges are edges of walls of the cross sectional view of the vessel, and
determining the encircled point as a point encircled by the edges of the cross sectional view of the vessel.

Further, the method according to this embodiment of determining the encircled point as a point encircled by the edges of the cross sectional view of the vessel may comprise:
generating test circles having different radii within a preselected interval of radii, where a plurality of test circles with different radii are centered at a plurality of edge points along the edges,
counting the number of intersections of the test circles at different locations within an area encircled by the edges,
selecting a location encircled by the edges which has the largest number of intersecting test circles and using the selected location as encircled point.

Further, according to this embodiment an intersection of a test circle (with a radius from a preselected interval) is only considered if an intersecting test circle (with a radius from the same preselected interval) exists at a substantially diagonally located edge point of one of the vessel segments.

In an embodiment deforming the adaptable closed contour towards the edges of the cross sectional view of the vessel is based on energy method comprising
defining an energy function for the elasticity and bending stiffness of the adaptable contour,
defining an energy function for the wall of the vessel based on an intensity function of the image, where the energy function defines a minimum energy at an edge of the wall,
defining an energy function that makes the adaptable contour expand, and
determining parameters of the closed contour which parameters defines the shape of the closed contour, by determining the parameters so that sum of energy functions is minimized.

In an embodiment the imaging device comprises a structure shaped to accommodate a part of the blood vessel, and the medical images show structural features of the structure, and analyzing the medical images comprises identifying imaged structural features in at least one of the plurality of images, where the imaged structural features defines a part of the image which contains the cross-sectional view of the blood vessel.

By utilizing that certain structures of the imaging device is visible in the medical image and that a relevant part of the image, i.e. a part showing the vessel, is distinct from other parts of the image showing structures of the imaging device, the relevant part can be extracted from the image. Thereby, the processing of the image may become more effecting since part that are not relevant need not be processed.

In an embodiment determining edges in the medical image comprises,
determining gradient magnitudes from horizontal and vertical gradients, and gradient directions, for each pixel of the image,
determining groups of pixels having the same gradient direction,
from the pixels having the same gradient direction, determining the pixel which has the largest gradient magnitude.

The determination of edges may be used as a preprocessing step which result, i.e. the edges, are used for determining a point encircled by the wall of the vessel.

In an embodiment the system is configured for determining flow properties of a bypass blood vessel branching off an existing blood vessel. Use of the system may be particularly useful for assessing the quality of a bypass blood vessel, since a bypass vessel preferably should provide the same flow property as compared to a normal vessel.

In an embodiment the processing unit is configured for determining at least one of an image representing a cross-section where the bypass blood vessel and the existing blood vessel constitute separate passageways, an image representing a cross-section where the bypass blood vessel and the existing blood vessel constitute a common passageway, and an image representing a cross-section where the existing blood vessel is the sole passageway, where the selection is performed by selecting images by analyzing the shapes and/or number of closed vessel contours.

A second aspect of the invention relates to a method for determining flow properties of a blood vessel, by analyzing medical images of cross-sectional views of the blood vessel, the method comprises:

a) determining a point encircled by a wall of the cross sectional view of the vessel of an image, b) using the encircled point to obtain a closed vessel contour which models the wall of the cross sectional view of the vessel by locating an adaptable closed circular contour so that it surrounds the encircled point and deforming the adaptable closed contour towards the wall of the cross sectional view of the vessel, for a plurality of the images, where at least some of the the plurality of images originate from different locations along a length of the blood vessel, and the method further comprises selecting a reference image and determine a reference area or reference radius of the closed vessel contour, where the reference image originate from a reference location of the vessel, for at least some of the plurality images analysed according to steps a) and b) determine an area or radius of the closed vessel contour, and comparing the reference area or reference radius with an area or radius of one of the plurality of images so as to obtain information about the flow property of the blood vessel.

In an embodiment the method is for determining flow properties of a bypass blood vessel branching off an existing blood vessel. Thus, the method may be particularly beneficial for use in connection by surgery related to insertion of bypass vessels.

An alternative aspect of the invention relates to a system for determining flow properties of a blood vessel, where the system comprises a processing unit for analyzing medical images of a cross-sectional view of the blood vessel, where the images are obtained from an medical imaging device, and where the processing unit includes electronic hardware and/or a processor for executing computer program code, the hardware and/or the computer program being configured for analyzing the images by performing steps:

determining a point encircled by a wall of the cross sectional view of the vessel, using the encircled point to obtain a closed vessel contour which models the wall of the cross sectional view of the vessel by centering an adaptable closed circular contour at the encircled point and deforming the adaptable closed contour towards the wall of the cross sectional view of the vessel, for one or more of the images, and by performing steps:

selecting an image from the plurality of images based on determining a specific expansion state of the vessel, and determining an area or radius of the closed vessel contour of the selected image so as to obtain information about the flow property of the blood vessel.

In general the various aspects and embodiments of the invention may be combined and coupled in any way possible within the scope of the invention. These and other aspects, features and/or advantages of the invention will be apparent from and elucidated with reference to the embodiments described hereinafter.

In summary the invention relates to a method for providing quantitative measures of the flow property of a blood vessel. The method is based on analyzing cross-sectional images of a vessel by estimating the area of the lumen of the vessel. The method comprises steps of determining a point contained within the walls of the vessel, determining a closed path which approximates the inner circumference of the wall of the vessel, and determining the area of the closed path when the vessel is most expanding in order to get a measurement of the maximum lumen. This method may enable the clinical personnel to quickly evaluate the flow property e.g. of an inserted bypass vessel and, thereby, conclude if the surgical intervention is successful or if adjustments are required.

BRIEF DESCRIPTION OF THE DRAWINGS

Embodiments of the invention will be described, by way of example only, with reference to the drawings, in which.

DETAILED DESCRIPTION OF EMBODIMENTS

Figure 1:
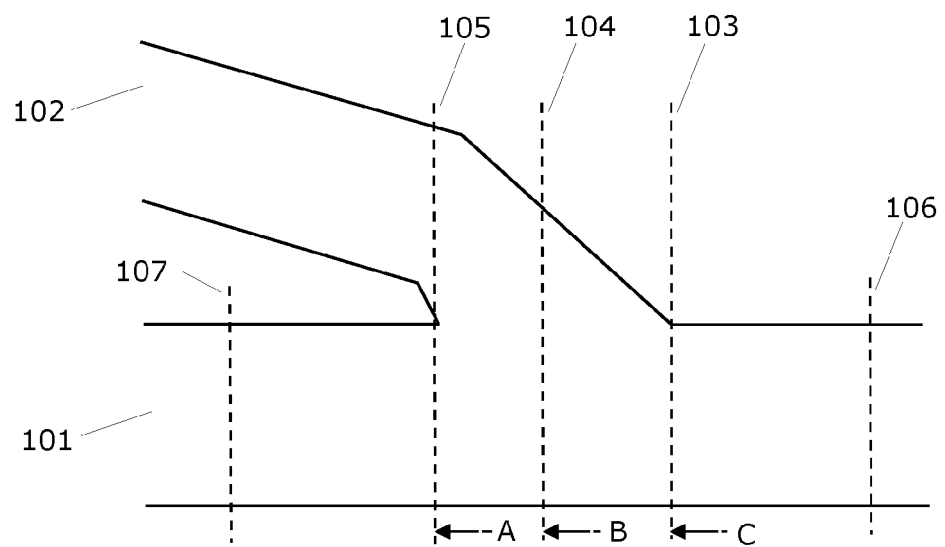
FIG. 1 illustrates longitudinal and perpendicular cross-sectional views of a joint between a blood vessel and a bypass vessel.
Figure 1:
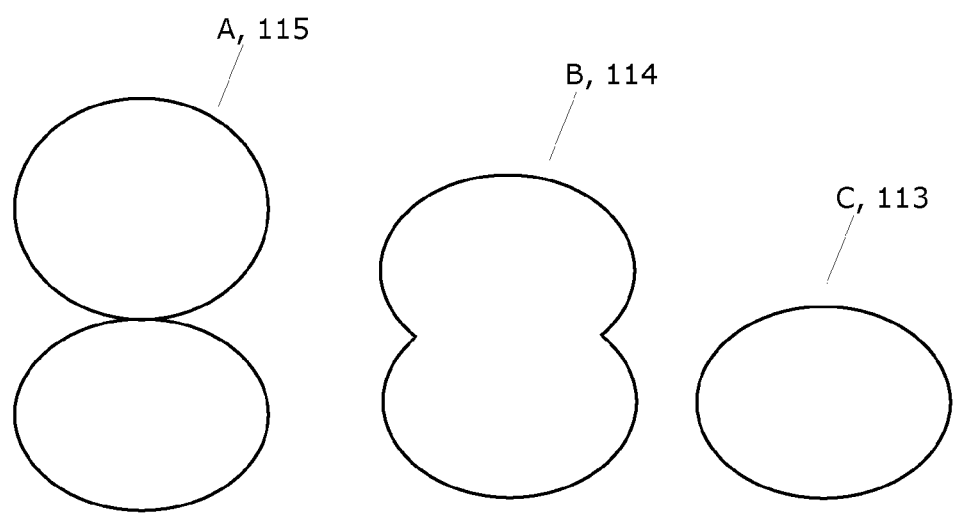

FIG. 1 shows a longitudinal cross-sectional view of a blood vessel, e.g. a coronary artery 101 and a bypass vessel or bypass graft 102 joined to the artery by a clinical bypass operation.

To ensure that the bypass graft works optimally it is required that the flow properties of the bypass graft 102 corresponds to the flow properties of the artery 101. Thus, the flow resistance generated by the bypass graft should not be larger than the flow resistance generated by a corresponding section of the artery. During insertion of the bypass graft 102 it may happen than that the graft is not inserted optimally so that free passage at the joint between the graft and the artery is too small.

An embodiment of the invention provides a method for determining the flow properties of be graft by determining areas of the free passage of the joint. The areas may be determined at different longitudinal locations, such as locations 103-105 indicated in FIG. 1. Cross-sectional views A, B and C of the joint referred to as heel, center and toe views are illustrated as images 113, 114, and 115, respectively. The selection of images from different longitudinal locations may be performed manually or automatically, e.g. by analyzing shapes of the cross sectional views of the vessel or vessels.

Images from different locations along the blood vessel may be selected manually by recording a plurality of images by use of a medical imaging device configured to be displaced along the vessel. Thus, while the medical imaging device is displaced along the length of the vessel a plurality of images are obtained which show cross sectional views of the vessel at different locations along the vessel.

The heel, center and toe views may be used to characterize the flow properties of the graft at three locations along the joint. In order to determine if the flow property of the graft is satisfactory, the areas of the lumen defined by the wall of the vessel at the heel, center and toe views may be compared with corresponding areas of reference cross sectional views 106, 107 located at both sides of the joint.

As an example, a reference image may be selected when the medical imaging device is placed at a reference location 106 or location 107. The reference location 106, 107 should be selected so that the flow properties at the reference location is unaffected, e.g. by a joint between the artery and an inserted graft or other objects which possibly increases flow resistance in a section of the blood vessel.

Thus, in order to obtain information about the flow property of the blood vessel for evaluating if the flow property of the vessel is satisfactory a reference area or reference radius of a reference image is compared with an areas or radii of a plurality of images originating from different locations along a length of the blood vessel.

The reference image is selected so that it originates from a reference location and a reference area or reference radius of the closed vessel contour 510 of the reference image is determined. The reference image may be manually obtained e.g. by activating a button which initiates the imaging of the blood vessel, or the reference image may be selected as the first image of the plurality of images which are recording during displacing the medical imaging device. Thus, the operator of the medical imaging device should initially place the imaging device so that the first image is recorded at a location which is unaffected by the modification of the vessel structure performed for improving flow properties.

The plurality of images are selected so that they originate from different locations along a length of the blood vessel and area or radius values of the closed vessel contour 510 of each or a selection of the plurality of images are determined.

Thus, the surgeon may place the medical imaging device at a suitable reference location 106, activate the imaging button to record the reference image, start moving the imaging device along the blood vessel—over the length where the flow property should be evaluated—to obtain a plurality of images. The areas or radii of the reference image and the plurality of images at different locations may be compared continuously as the imaging device is moved or the area/radius data may be compared after the images have been recorded.

Since variations of the area of the lumen of the blood vessel due to the "heart contractions" are within 10-20 percent relative to the maximum area, the comparison provides a result which is sufficiently accurate for evaluating the flow properties, i.e. for evaluating if the graft of other vessel modification negatively effect the flow property relative to the reference area or radius.

Figure 2:
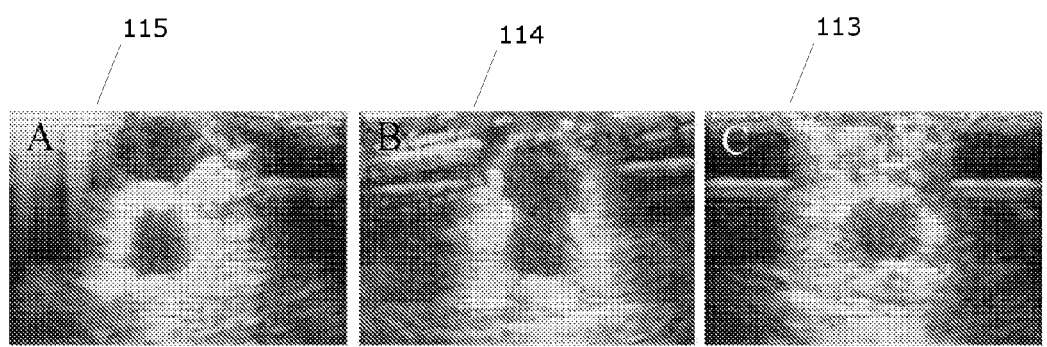
FIG. 2 shows images of cross sectional views at different locations.

FIG. 2 shows images of cross sectional views at the heel, center and toe locations obtained by ultrasonic imaging. In order to be able to determine e.g. the area of the lumen of the vessel it is necessary to determine an inner edge of the wall of the vessel.

The edge of the wall may be determined generally by determining gradients of the image intensity, where the image pixels having the largest gradients constitute an edge pixel. The image intensity may be described by an intensity function I (x,y) as a function of the pixel locations in the image.

For example the known Canny method may be used for determining edges in an image, where the Canny method comprises the steps:

Step 1: The image is blurred by use of a smoothing filter in order to reduce image noise. For example the Gaussian smoothing filter $$G(x, y) = \frac{L}{2\pi\sigma^2} e^{-\frac{x^2+y^2}{2\sigma^2}}$$

may used where $\sigma$ is the standard deviation of the Gaussian distribution determining the amount of detail preserved in the image. The parameters x and y are pixel coordinates and the sum of squares of the coordinates is the squared distance from the origin of a pixel being smoothed.

Step 2: Detecting of horizontal and vertical gradients, from which the gradient magnitudes are calculated as: $|G|=|Gx|+|Gy|$. The direction of the edge is calculated as:

$$\Theta = \operatorname{atan2}\left(\frac{Gy}{Gx}\right).$$

Step 3: Relating the edges to the nearest traceable direction in the image. As an image is composed of equally sized pixels all surrounding pixels to any point can only be located in four directions: 0, 45, 90 and 135 degrees. Thus any gradient direction detected in the range of e.g. 22.5 to 67.5 degrees is set to 45 degrees and so on.

Step 4. A non maximum suppression converting blurred edges to sharp edges. In this process all pixels with the same gradient direction are compared with the local pixels located in that direction. For each pixel the maximum is preserved while everything else is set to zero. This results in a thin edge with a thickness represented by one pixel.

Step 5. A double threshold dividing the intensity of each pixel into three groups: strong, week and suppressed edges. The strong edges are considered certain edges and the a week edge is only included if it is connected to a strong edge. This process cleans the image to only contain the most dominant edges.

Step 6. An edge tracking filtering out any blob of the remaining edges not containing a strong edge.

Thus, the Canny method basically includes the steps of determining gradient magnitudes from horizontal and vertical gradients, and gradient directions, for each pixel of the image, determining groups of pixels having the same gradient direction, and from the pixels having the same gradient direction, determining the pixel which has the largest gradient magnitude.

Figure 3:
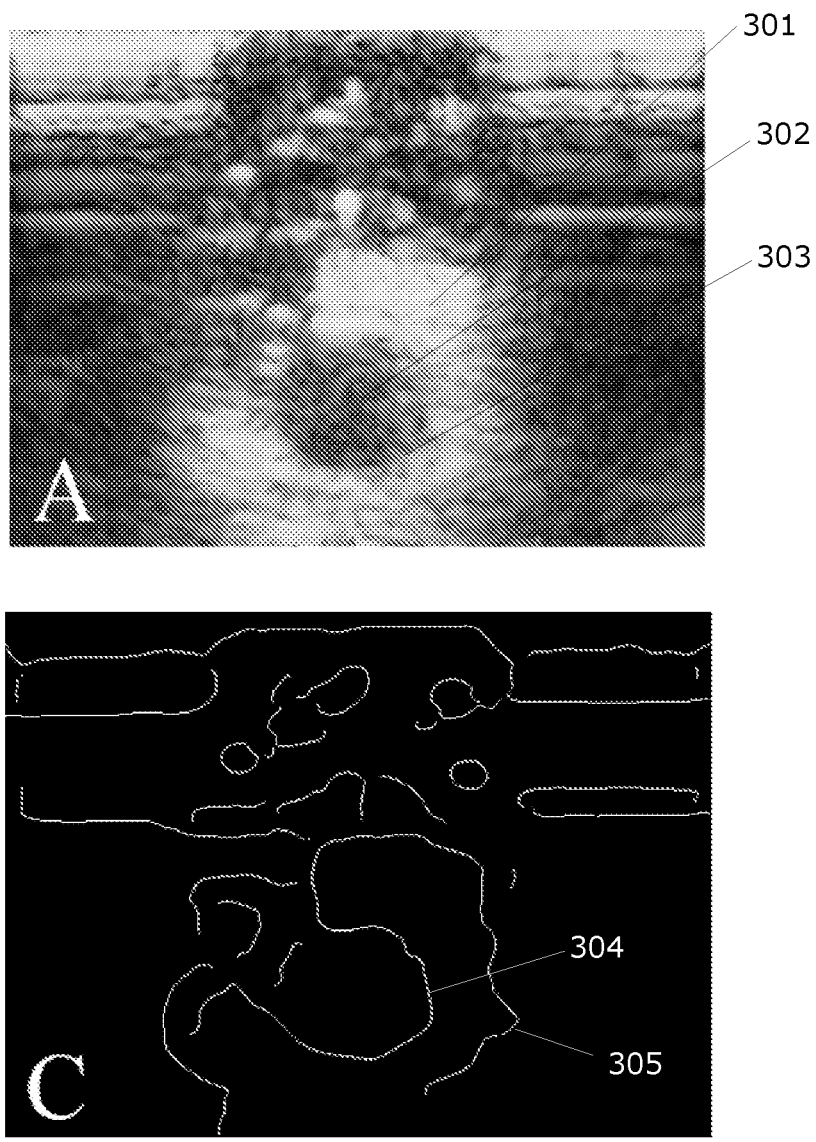
FIG. 3 shows edges (picture C) determined from picture A.

FIG. 3 shows the result of determining edges of an image, where the original image is indicated with an A and the edge converted image is indicated with a C. The original image shows a segment of the wall 301 of the vessel, the lumen 303 and the inner edge of the wall of the vessel 303. Since the imaging of the vessel may not be perfect, the cross-sectional view may not show a closed wall of the vessel but often only a segment or some unconnected segments. The edge converted image shows the identified inner edge 304 of the vessel as well as other edges 305. Since the cross sectional view in image A also show additional tissue, edges of such additional tissue is also determined. However, at least some of the edges in image C are inner edges of segments of the cross sectional view of the wall of the vessel. Depending on the algorithm used for detecting edges, alternatively or additionally an outer edge or an intermediate edge of the wall may be determined. Whereas the description refers to the inner edge 304 of the vessel, this edge 304 may equivalently refer to other edges of the vessel, such as an intermediate edge located between the actual inner and outer edges.

A step according to an embodiment of the invention comprises determining a point encircled, i.e. surrounded, by edges of the cross sectional view of the vessel or encircled by the wall 301 of the vessel.

It is understood that the point need not be an exact point defined by two coordinates in a 2D image but could also be a collection of points, such as points of an an identifyable image portion which is typically surrounded by the wall 301 of the vessel, points of a geometrical object such as a polygon defined by parts of the wall 301, or points obtained from a pointing device, e.g. a touch sensitive screen, which enables a user to indicate a point surrounded by the wall 301 of the vessel.

For example, the encircled point may be the center of a circle which provides a best fit to the inner edge 304 of the edge converted image. Since the inner edge 304 defines the lumen of the vessel, a method for determining a circle which fits to the inner edge 304 comprises comparing a plurality of circles with the inner edge 304 until a best fit is found, e.g. by use of a minimization method where a sum of a plurality of radial distances between the candidate circle and the vessel edge is minimized. The circle center is given by the determined circle.

Alternatively, a point encircled by edges of the cross sectional view of the vessel may be found by determining the best correlation between a test circle with a predetermined fixed radius and the edges 304, 305 of the image. The best correlation typically results in a location of the test circle where the center of the test circle is encircled by the inner edge 304.

In an alternative embodiment of the invention for determining the center of a circle which provides a best fit to the inner edge 304, circles having radii within a preselected interval of radii (rmin, rmax) are centered along the edges 304 in the edge converted image. The interval of different radii is selected from typical radii of lumen's 302. This method is illustrated in FIG. 3 and described below.

Figure 4:
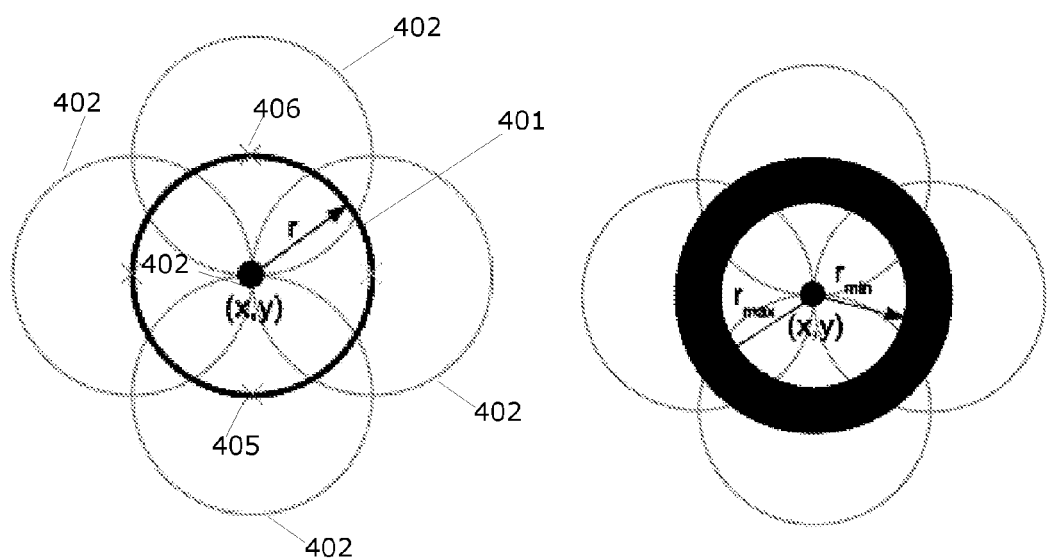
FIG. 4 illustrates a method for determining a point encircled by the wall of a vessel.

FIG. 4 shows a circle 401 which illustrates the inner edge 304 of the vessel, i.e. a curve which center is unknown and must be determined. By drawing test circles 402 centered at edge points along the circle or edge 304, a number of intersections of the test circles are obtained. Clearly, in FIG. 4 the test circles have the same radius as the "unknown" circle 401 and, therefore, the number of intersections of the test circles is largest at the center (x,y). Thus, by counting the number of intersections of the test circles having radii within a preselected interval of radii (rmin, rmax), the center of an unknown ideal circle can be uniquely determined as the point having the largest number of intersections assuming that the radius of the unknown circle is within the interval of radii (rmin, rmax).

The inner edge 304 of the vessel may not be perfectly circular, however, by generating circles with radii within the interval (rmin, rmax) and centering them along points of the edges 304, 305, the point or region have the largest number of intersections of circles can be considered as the center of the vessel. This is illustrated by the illustration to the right in FIG. 4, where the circular band with a minimum radius rmin and a maximum radius rmax correspond to minimum and maximum radii of the closed edge of the vessel. Thus, by counting the number of intersections of the test circles at different locations within a specific area such as the area encircled by the edges or other features in the image (e.g. imaging device features), the center of the cross-sectional view of the blood vessel can be determined as the location which has the largest number of intersecting test circles. The location may comprise one or more pixels, e.g. a square of e.g. 16 pixels.

In order to reduce the number of false candidates for the vessel center generated by edges 304 which are not an edge of the vessel, a criteria can be set so that an intersection of a test circle within a given location is only considered if an intersecting test circle exists at a substantially diagonally located edge point of one of the vessel segments. Thus, the edge point 405 of the edge 304 is only considered if the substantially diagonally located edge point 406 exists, where the edge points 405, 406 have associated test circles which intersect within a common location or area.

Typically multiple clusters of center point candidates are generated both in and outside the vessel lumen 302. The mean center point of each cluster is selected by cluster analysis, e.g. by calculating the k-means relative to the number of clusters detected.

This detection is done using a simple grid search positioned around each center point. To select the true center located within the vessel lumen from the remaining candidates all remaining points are plotted in the original image. The selection rule is based on the fact that the true inner circular edge must be placed within the vessel lumen in which the image intensity is expected to be significantly lower than outside. A circle with radius equal to rmin is created around each center point. The center with the lowest of the mean intensities calculated within each circle is selected as the detected center of the vessel.

When the center (x,y) in the medical image or equivalently, a point encircled by edges 304, has been determined, a radius of the circle associated with the center is determined, i.e. the circle which represents the inner edge of the vessel. The radius may be given by the predetermined radius of the circle correlated with edges 304, 305. Alternatively, the radius can be determined from the set of test circles intersecting in the associated center point (x,y) for example as the smallest radius of the intersecting test circles or as a mean radius of the intersecting test circles. Alternatively, the radius of the circle can be set according to the type of image. For example, if the image shows a heel view 113, the radius may be set according to a typical radius of the lumen near the heel location of a vessel. The type of image may be inputted manually by clinical personnel or determined by image analysis.

Thus, the radius associated with the center in the medical image may be predetermined, selected from the interval of radii or selected from other criteria, such as typical radii of vessels. The selected or determined radius and the determined center are used as an initial adaptable closed circular contour for a determining a closed vessel contour which models the edges of the cross sectional view of the vessel according to a method described below.

After the encircled or surrounded point, i.e. the approximate centre point a or collection of points of the lumen 302, has been set as the center point of the adaptable closed circular contour, the adaptable contour is deformed towards the wall 301 or the edges 304 of the cross sectional view of the vessel so as to obtain a closed vessel contour which models the inner edge 304 of the cross sectional view of the vessel.

Whereas the edge 304 may be used for adapting the contour to approximate the lumen 302 of the vessel, it may be better to use the intensity function I (x,y) of the wall 301 for adapting the contour. For example the intensity function may be filtered using a gradient function to identify an edge, preferably the inner edge of the wall 302.

Figure 5:
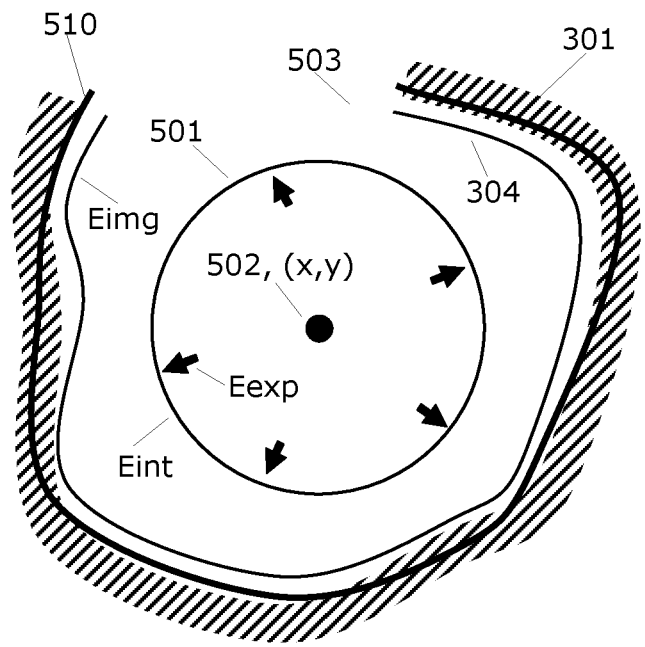
FIG. 5 illustrates a method for deforming an adaptable contour towards the wall edges of a vessel.

FIG. 5 illustrates an energy based method for deforming the adaptable contour towards the wall 301 or edges 304 of the segments of the cross sectional view of the vessel. The finally adapted contour which models the wall, e.g. inner edge, of the cross sectional view of the vessel is referred to as a closed vessel contour 510. The circle 501 illustrates the adaptable closed circular contour which is centered at the point (x,y), 502 determined as the point encircled by the edges 304, 305 and which has a radius determined as explained above. The inner edge 304 and a segment 301 of the wall of the vessel are schematically illustrated. According to the energy based method, the adaptable contour 501 is modeled by an internal energy function Eint which defines the contour's elasticity and bending stiffness according to the equation:

$$E_{int}=(\alpha(s)|v'(s)|^2+\beta(s)|v''(s)|^2)/2$$

where v'(s) and v''(s) denote the first and second derivatives of the parametrically defined adaptable closed contour v(s) (commonly referred to as a snake) with respect to the arc length s. Adjusting the two weight coefficients $\alpha(s)$ and $\beta(s)$, determines how much the snake is allowed to stretch and bend at a given point.

Thus, alpha(s) controls the tension between points and $\beta(s)$ controls the rigidity or bending stiffness of the contour so that $\alpha(s)$ and $\beta(s)$ determine how much the closed contour is allowed to stretch or bend at a given point s.

Further, according to the energy based method, en image energy function Eimg is defined for the inner edge 304 or a segment of the wall 301 of the vessel. The purpose of the image energy function is to define a local minimum energy at the desired border of the wall of vessel, for example along the inner edge 304, in order to attract or capture the adaptable contour 501 at the desired border of the vessel. For images where the cross-sectional view of the blood vessel is defined by the intensity function I(x,y) where x,y defines pixel point in the image, the image energy function can be defined as:

$$E_{images}(x,y)=-\nabla[G_\sigma(x,y)*I(x,y)]$$

where $G\sigma(x,y)$ is a Gaussian function with standard deviation $\sigma$, and where $\nabla$ is the gradient operator. The combination creates a gradient image with local minima at the boundaries left after the Gaussian function, i.e. approximately along the inner edge 304.

In order to force the adaptable contour 501 towards the minimum energy values of the image energy function Eimg, a global expansion energy function Eexp that makes the adaptable contour 501 expand towards the desired inner edge 304 when no image force is present, for example along the undefined path 503 of the closed inner edge 304. The expansion energy function Eexp is defined as the direction normal at each point of the adaptable contour 501 by $$E_{expand}=n_i$$

where n(s) is a normal vector to the closed contour at point s. The expansion energy function gives the snake a more dynamic behavior and helps the snake from being trapped from isolated energy minima in the cross-sectional view of the blood vessel.

The parameters of the adaptable closed contour v(s) which minimizes the sum of energies Eint+Eimg+Eexp and, thereby the parameters of v(s) which determines the closed vessel contour, can be found e.g. by a steepest descent method where the gradient of the sum of energies Eint+Eimg+Eexp is determined and where the minimum of the energy function is found by adjusting the parameters along the negative gradient. An explanation of the steepest descent method may be found in Advanced Engineering Mathematics, Erwin Kreyszig, 7th edition, pages 1084-1086.

The adaptable closed contour may alternatively be described as a polygon, i.e. a closed path consisting of a plurality of linear light segments whose length and angle relative to neighbor segments can be adjusted. Accordingly, by adjusting the length and relative angles of the polygon so that the line segments moves towards the inner edge 304, the closed vessel contour and, thereby, an approximation of the inner edge can be determined. Constraints of the angle and lengths of the segments can be set to avoid that segments moves away from the inner edge, e.g. at open sections 503 of the inner edge. The adjustment of the polygon segments can be performed by adjusting the length and angle parameters along the negative gradient of a performance function. The performance function may equate the distance between the polygon edges and the closed contour 502, e.g. from the center point of each segment, and the gradient is determined as the derivative of the performance function relative to the length and angle parameters.

It is clear that the adaptable contours described above need not necessarily be exactly centered at the point 502 encircled or surrounded by the wall 301, but it may be sufficient that the adaptable contour 501 is located so that it surrounds the encircled point 502. That is, even if the adaptable contour is not exactly centered at the point 502, the energy method is able to expand the adaptable contour towards the desired inner edge 304 of the vessel wall 301. Similarly, adjustments of segments of a polygon can also be adapted towards the vessel wall even if the polygon is not centered at the point 502.

The above steps including one or more of determining edges, determining encircled points adaption of a closed contour towards the inner edges is performed at least for one or more of the images showing cross-sectional views of the blood vessel for a single location of the vessel.

During imaging of the vessel, the medical imaging device records a sequence of images. The images show different expansion states, i.e. the area of the lumen 302 of the vessel varies over time and in relationship with the pulsation of the heart.

In order to obtain information about the flow property of the blood vessel, an image which is characteristic for a specific expansion state is selected. The specific expansion state preferably refers to the state where the vessel is expanded most, but may also refer to other expansion states, for example the state where the vessel shows the largest contraction.

Since the expansion state of the vessel is correlated with the pulsation of the heart and, thereby, an electrocardiograph signal (EKG), the image which is characteristic for the specific expansion state of the vessel may be determined from the electrocardiograph signal. For example, characteristic peaks of the electrocardiograph signal may trigger the selection of the specific image, or may trigger a delay before the specific image is selected.

Alternatively, the image which is characteristic for the specific expansion state of the vessel may be determined by determining an area or a radius of the vessel by determining an area or radius of the closed vessel contour which has been adapted towards the edges 304 of the cross sectional view of the vessel. The area may be determined by for example by overlaying the adapted vessel contour with a grid and calculating the area of the grid elements which are encircled by the adapted vessel contour. Similarly a radius, e.g. a maximum radius may be determined by analyzing the adapted vessel contour.

After the image which shows the specific expansion state has been selected, the area or radius of the lumen of the selected image is calculated, for example as described above using a grid with known grid cells. Clearly, if the characteristic image was selected by calculating the area of the lumen, this calculated area is used.

Figure 6:
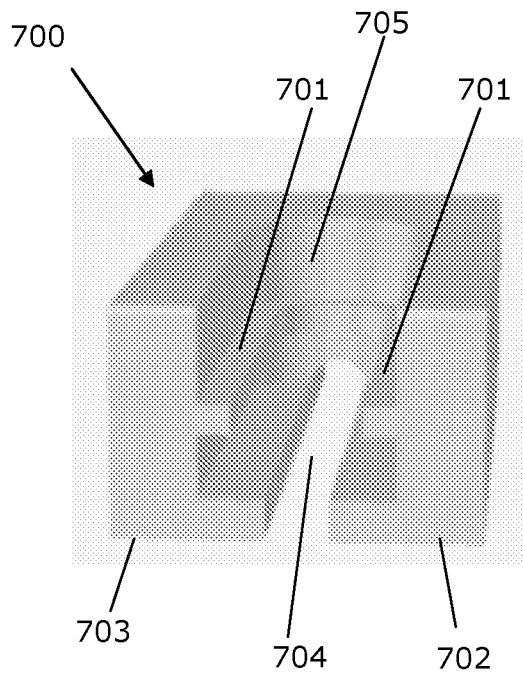
FIG. 6 shows a structural device used together with a scanning probe, where the structural device is shaped to accommodate a section vessel.

FIG. 6 shows in an example a structural element 700 of a medical imaging device 901. The structural element 700 comprises two skin supports 702, 703 which are intended for being positioned against a tissue, e.g. of a beating, and thus pulsating, heart. The skin supports stabilize the area of which imaging is required.

Between the skin supports a cavity 704 is provided for accommodating the vessel to be imaged, e.g. a bypass graft, heart muscles, anastomoses or coronary vessels.

The structural element 700 also comprises an aperture 705 for receiving e.g. an ultrasonic probe to be used together with the structural element. To make sure that the probe is properly secured in the structural element 700, the device may comprise fixing elements 701 for securing the probe to the structural element 700. Examples of fixing elements 701 are one or more protrusions or notches which match corresponding protrusions or notches of the probe for holding the probe in the structural element. The shape and size of such protrusions or notches may vary. In the embodiment shown, protrusions in the shape of beads are provided.

Figure 7:
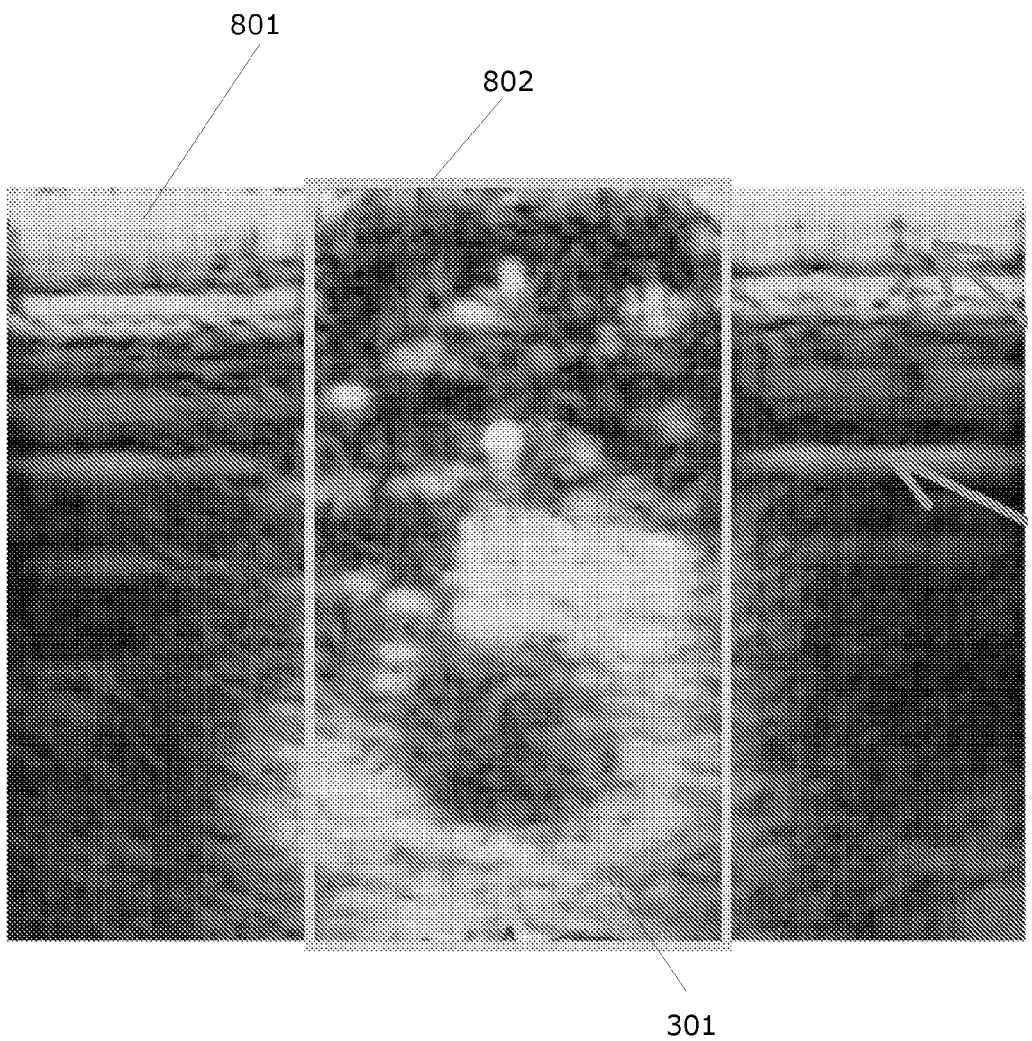
FIG. 7 shows how features of the structural device is imaged together with the vessel.

FIG. 7 shows a medical image of a cross-sectional view of the blood vessel 301. In addition to the vessel 301, the image also shows structural features 801 of the structural element 700. In this example, the beads 701 of the structural element 700 are imaged as the structural features 801. Since the vessel is accommodated by the cavity 704 located between the beads 701, it is known that the image of the vessel 301 is located between the image parts showing the structural features 801. Accordingly, before the entire image is analyzed by determining one or more of edges, centre points and adapting the closed vessel contour, the part of the image which contains the cross-sectional view of the blood vessel 301 can be determined by identifying imaged structural features 801 in the one or more images. In FIG. 7 the part of the image which contains the blood vessel 301 is shown by rectangle 802.

In an embodiment a processing unit 902 (see FIG. 8) is configured for automatically determining predefined cross sectional views of the vessel from a selection of images showing different cross sectional views along the length of a vessel, such as a bypass blood vessel. For example, the processing unit may be configured to select an image representing a cross-section where the bypass blood vessel and the existing blood vessel constitute separate passageways such as the heel view 115, an image representing a cross-section where the bypass blood vessel and the existing blood vessel constitute a common passageway such as the center view 114, and an image representing a cross-section where the existing blood vessel is the sole passageway such as the toe view 113. The selection of images may be performed by analyzing the shapes and/or number of closed vessel contours in the image. For example, the heel view 115 may be identified when two closed paths are determined, the center view may be identified when a closed contour has an elongate shape with a specific ratio between the elongate length and the perpendicular width, and the toe view 113 may be identified which the closed contour has a specific shape.

Figure 8:
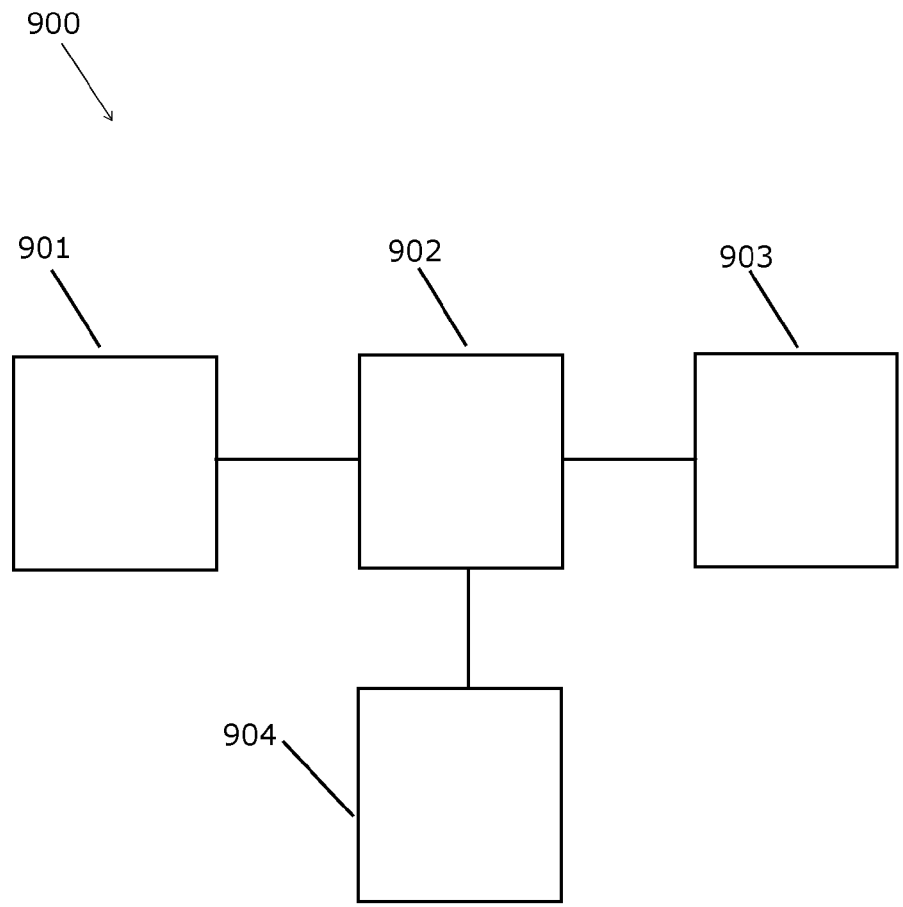
FIG. 8 illustrates a system according to an embodiment of the invention.

FIG. 8 shows the system 900 for determining flow properties of a blood vessel. The system 900 comprises a medical imaging device 901, for example an ultrasound imaging device 901 or a magnetic resonance imaging device, and a processing unit 902 for processing the images from the imaging device. The processing unit may be a computer, an image processor or other computing systems configured for analyzing images. The system 900 may further comprise a display 903 for visualization of the images and processed images and a user input device 904 enabling the user to provide input information to the processing unit.

Figure 9:
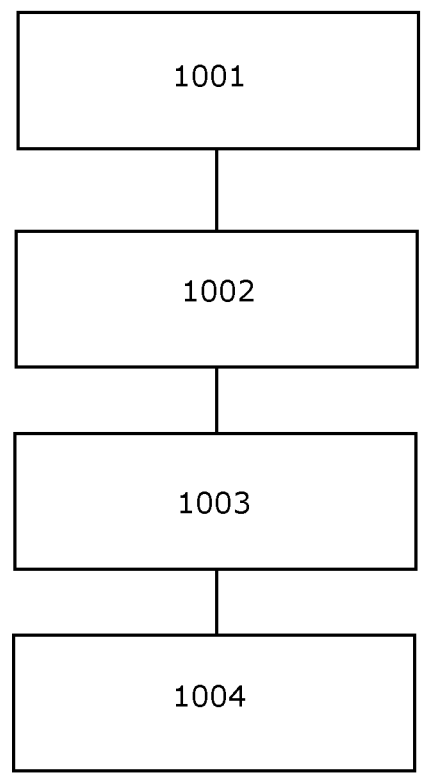
FIG. 9 illustrates a method according to an embodiment of the invention.

FIG. 9 illustrates a method according to an embodiment of the invention comprising the steps:

Step 1001: Determining a point 502 encircled by a wall 301 of the cross sectional view of the vessel, Step 1002: Using the encircled point 502 to obtain a closed vessel contour 510 which models the wall of the cross sectional view of the vessel by centering an adaptable closed circular contour 304 at the encircled point 502 and deforming the adaptable closed contour towards the wall of the cross sectional view 301 of the vessel, Step 1003: Selecting an image from the plurality of images based on determining a specific expansion state of the vessel, and Step 1004: Determining an area or radius of the closed vessel contour of the selected image so as to obtain information about the flow property of the blood vessel.

The steps need not be performed in the listed order. Also some of the steps may be performed several times on a selection of images before other steps are initiated.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system for determining flow properties of a blood vessel, the system comprising a processing unit for analyzing medical images of cross-sectional views of the blood vessel, where the images are obtained from a medical imaging device, and where the processing unit includes electronic hardware and/or a processor for executing computer program code, the hardware and/or the computer program code being configured for analyzing the images by performing steps of:
   a) determining a point encircled by a wall of the cross sectional view of the vessel,
   b) using the encircled point to obtain a closed vessel contour which models the wall of the cross sectional view of the vessel by locating an adaptable closed circular contour that surrounds the encircled point and deforming the adaptable closed contour towards the wall of the cross sectional view of the vessel, for a plurality of the images, where at least two of the plurality of images originate from different locations along a length of the blood vessel, and further configured for analyzing the images by performing steps of:
  selecting a reference image and determining a reference area or reference radius of the closed vessel contour, where the reference image originates from a reference location of the vessel;
  for at least two of the plurality images analyzed according to steps a) and b), determining an area or radius of the closed vessel contour; and
  comparing the reference area or reference radius with an area or radius of the closed vessel contour of one of the plurality of images to obtain information about the flow property of the blood vessel, wherein the blood vessel is a bypass blood vessel branching off an existing blood vessel, and wherein the processing unit is further configured for determining at least one of:
    an image representing a cross-section wherein the bypass blood vessel and the existing blood vessel constitute separate passageways,
    an image representing a cross-section wherein the bypass blood vessel and the existing blood vessel constitute a common passageway, and
    an image representing a cross-section wherein the existing blood vessel is the sole passageway, and
  wherein the selection of the reference image is performed by selecting images by analyzing the shapes and/or number of closed vessel contours.

2. The system according to claim 1, wherein the determining a point encircled by the wall of the cross sectional view of the vessel comprises determining a best fit between the wall and a predefined circle, or comprises determining which circle or circles of a selection of circles having radii within a preselected interval of radii (rmin, rmax) provides a best fit of the wall, wherein the center of the circle provides an estimate of the point encircled by edges of the cross-sectional view of the blood vessel.

3. The system according to claim 1, wherein the determining the encircled point comprises:
  determining edges in the medical image, wherein at least some of the edges are edges of walls of the cross sectional view of the vessel, and
  determining the point as a point encircled by the edges of the cross sectional view of the vessel.

4. The system according to claim 3, wherein the determining the point as a point encircled by the edges of the cross sectional view of the vessel comprises:
  generating test circles having different radii within a preselected interval of radii (rmin, rmax), wherein a plurality of test circles with different radii are centered at a plurality of edge points along the edges,
  counting the number of intersections of the test circles at different locations within an area encircled by the edges,
  selecting a location encircled by the edges, which has the largest number of intersecting test circles, and
  using the selected location as the encircled point.

5. The system according to claim 4, wherein an intersection of a test circle is only considered if an intersecting test circle exists at a diagonally located edge point of one of the vessel segments.

6. The system according to claim 3, wherein the determining of edges in the medical image comprises:
  determining gradient magnitudes from horizontal and vertical gradients, and gradient directions, for each pixel of the image,
  determining groups of pixels having the same gradient direction, and
  from the pixels having the same gradient direction, determining the pixel which has the largest gradient magnitude.

7. The system according to claim 1, wherein the deforming the adaptable closed contour towards the edges of the cross sectional view of the vessel is based on an energy method comprising:
  defining an energy function for the elasticity and bending stiffness of the adaptable contour,
  defining an energy function for the wall of the vessel based on an intensity function of the image, where the energy function defines a minimum energy at an edge of the wall,
  defining an energy function that makes the adaptable contour expand, and
  determining parameters of the closed contour, which parameters define the shape of the closed contour, by determining the parameters so that a sum of the energy functions is minimized.

8. The system according to claim 1, wherein the imaging device comprises a structure shaped to accommodate a part of the blood vessel, and wherein the medical images show structural features of the structure, and wherein analyzing the medical images comprises identifying imaged structural features in at least one of the plurality of images, wherein the imaged structural features defines a part of the image, which contains the cross-sectional view of the blood vessel.

9. A method for determining flow properties of a blood vessel, by analyzing medical images of cross-sectional views of the blood vessel, comprising:
  a) determining a point encircled by a wall of the cross sectional view of the vessel of an image,
  b) using the encircled point to obtain a closed vessel contour, which models the wall of the cross sectional view of the vessel by locating an adaptable closed circular contour that surrounds the encircled point and deforming the adaptable closed contour towards the wall of the cross sectional view of the vessel, for a plurality of the images, wherein at least two of the plurality of images originate from different locations along a length of the blood vessel, the method further comprising:
  selecting a reference image and determining a reference area or reference radius of the closed vessel contour, wherein the reference image originates from a reference location of the vessel;
  for at least two of the plurality images analyzed according to steps a) and b), determining an area or radius of the closed vessel contour; and
  comparing the reference area or reference radius with an area or radius of the closed vessel contour of one of the plurality of images to obtain information about the flow property of the blood vessel, wherein the blood vessel is a bypass blood vessel branching off an existing blood vessel, and wherein the processing unit is further configured for determining at least one of:
    an image representing a cross-section wherein the bypass blood vessel and the existing blood vessel constitute separate passageways,
    an image representing a cross-section wherein the bypass blood vessel and the existing blood vessel constitute a common passageway, and
    an image representing a cross-section wherein the existing blood vessel is the sole passageway, and
  wherein the selection of the reference image is performed by selecting images by analyzing the shapes and/or number of closed vessel contours.

* * * * *